United States Patent
Hung et al.

(10) Patent No.: US 11,295,734 B2
(45) Date of Patent: Apr. 5, 2022

(54) SYSTEM AND METHOD FOR DETECTING ELECTRONICALLY BASED RESPONSES TO UNANSWERED COMMUNICATION SESSION REQUESTS

(71) Applicant: VONAGE BUSINESS INC., Atlanta, GA (US)

(72) Inventors: Antonio Hung, Poughkeepsie, NY (US); Tony Chan Sion Moy, Santa Clara, CA (US); Oscar Rodriguez, Westminster, CA (US)

(73) Assignee: Vonage Business Inc., Atlanta, GA (US)

( * ) Notice: Subject to any disclaimer, the term of this patent is extended or adjusted under 35 U.S.C. 154(b) by 187 days.

(21) Appl. No.: 16/830,640

(22) Filed: Mar. 26, 2020

(65) Prior Publication Data

US 2021/0304742 A1 Sep. 30, 2021

(51) Int. Cl.

| | |
|---|---|
| *G10L 15/197* | (2013.01) |
| *H04M 7/00* | (2006.01) |
| *G10L 15/16* | (2006.01) |
| *G10L 15/22* | (2006.01) |
| *G10L 15/18* | (2013.01) |
| *G06N 20/00* | (2019.01) |
| *G06N 3/08* | (2006.01) |
| *G10L 25/18* | (2013.01) |

(52) U.S. Cl.
CPC ............. *G10L 15/197* (2013.01); *G06N 3/08* (2013.01); *G06N 20/00* (2019.01); *G10L 15/16* (2013.01); *G10L 15/1822* (2013.01); *G10L 15/22* (2013.01); *G10L 25/18* (2013.01); *H04M 7/0021* (2013.01); *G10L 2015/223* (2013.01)

(58) Field of Classification Search
CPC ... G10L 15/197; G10L 15/16; G10L 15/1822; G10L 25/18; G10L 2015/223; G06N 20/00; G06N 3/08; H04M 7/0021
See application file for complete search history.

(56) References Cited

U.S. PATENT DOCUMENTS

| | | | |
|---|---|---|---|
| 8,638,910 B2 * | 1/2014 | Chatterjee | H04M 3/53333 379/88.18 |
| 10,511,908 B1 * | 12/2019 | Fisher | G10L 21/0224 |
| 11,095,775 B1 * | 8/2021 | Hitchcock | H04M 3/53383 |

(Continued)

OTHER PUBLICATIONS

"Answering Machine Detection", https://www.twilio.com/docs/voice/answering-machine-detection, 2020, 9 pages.

*Primary Examiner* — Mohammad K Islam
(74) *Attorney, Agent, or Firm* — Moser Taboada; Joseph Pagnotta (57) ABSTRACT

Methods and systems for detecting an answering machine/voicemail system using a machine learning model are provided herein. In some embodiments, a method for detecting an answering machine/voicemail system using a machine learning model comprises receiving an audio stream from a telecommunication session; parsing the audio stream into a plurality of audio files; converting each of the plurality of audio files into an image; inputting each of the converted images into the machine learning model; receiving a prediction from the machine learning model; sending an indication that an answering machine/voicemail system is detected when the received prediction is a beep.

20 Claims, 5 Drawing Sheets

(56) References Cited

U.S. PATENT DOCUMENTS

| | | | |
|---|---|---|---|
| 2019/0244613 A1* | 8/2019 | Jonas | H04M 7/006 |
| 2020/0234517 A1* | 7/2020 | Campanella | G06F 9/541 |
| 2021/0089907 A1* | 3/2021 | Rogers | G06K 9/6232 |
| 2021/0183366 A1* | 6/2021 | Reinspach | G10L 15/187 |

* cited by examiner

SYSTEM AND METHOD FOR DETECTING ELECTRONICALLY BASED RESPONSES TO UNANSWERED COMMUNICATION SESSION REQUESTS

BACKGROUND

Field

Embodiments of the present invention generally relate to machine learning models, and more specifically, to a method and system for detecting an answering machine/voicemail system using a machine learning model.

Description of the Related Art

A call goes to an answering machine or voicemail system when the person cannot pick up the call or does not want to pick up the call. However, when making a call, callers often do not wish to waste time leaving a message, or even waste time determining whether they are dealing with an answering machine/voicemail system. Answering machine/voicemail system detection is meant to screen out calls that get sent to voice mail inboxes. With almost half of all calls to consumers going to voicemail, answering machine/voicemail system detection is an excellent tool.

However, current answering machine/voicemail system detection techniques are lacking in accurate detection by mistakenly determining that a voice mailbox message is an actual live person, determining a delay in a system connecting a call to an agent is an answering machine/voicemail system, or incorrectly guessing a live person is an answering machine/voicemail system.

Therefore, there is a need in the art for detecting electronically based responses to unanswered communication requests and preferably incorporating machine learning (ML) techniques.

SUMMARY

In some embodiments, a method for detecting an answering machine includes accessing a plurality of training audio files; converting each of the plurality of audio file into an image that is a visual representation of the audio file; inputting each of the converted images into the machine learning model; and for each converted image: receiving a prediction of whether the input converted image is a positive indication of an answering machine/voicemail system; and adjusting a weight in the model when the prediction is incorrect.

In some embodiments, a method for detecting an answering machine/voicemail system using a machine learning model includes receiving an audio stream from a phone call; parsing the audio stream into a plurality of audio files; converting each of the plurality of audio files into an image; inputting each of the converted images into the machine learning model; receiving a prediction from the machine learning model; sending an indication into the phone call that an answering machine/voicemail system is detected when the received prediction is a beep.

In some embodiments, a system for detecting an answering machine/voicemail system using a machine learning model includes at least one storage device storing processor-executable instructions which, when executed by the at least one processor, perform the method for detecting an answering machine/voicemail system using a machine learning model.

In some embodiments, a computer readable medium for storing computer instructions that, when executed by at least one processor causes the at least one processor to perform the method for detecting an answering machine/voicemail system using a machine learning model.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to a method and system for detecting an answering machine/voicemail system using a machine learning model. A machine learning model is trained using two categories of audio files, specifically files including beeps, and files that include speech with no beeps. Each audio file is converted into an image (i.e., a Mel-spectrogram.) The image is input into the machine learning model and the machine learning model predicts whether the input includes a positive indication of an answering machine/voicemail system. If the machine learning model predicts incorrectly, a weight is given to the neural network for the machine learning model. The machine learning model is trained until the prediction accuracy is above a predefined threshold. When a call comes into a service provider, the service provider places the call to the specified number. The audio received by the service provider when the call is answered is input into an application, which uses the machine learning model to determine how the communication session request was terminated (i.e., by answering machine/voicemail system or a live human). If an answering machine/voicemail system is detected, a text-to-speech message is broadcast into the call indicating an answering machine/voicemail system was reached.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the following description, the terms VOIP system, VOIP telephony system, IP system and IP telephony system are all intended to refer to a system that connects callers and that delivers data, text and video communications using Internet protocol data communications. Those of ordinary skill in the art will recognize that embodiments of the present invention are not limited to use with IP telephony systems and may also be used in other systems.

Figure 1:
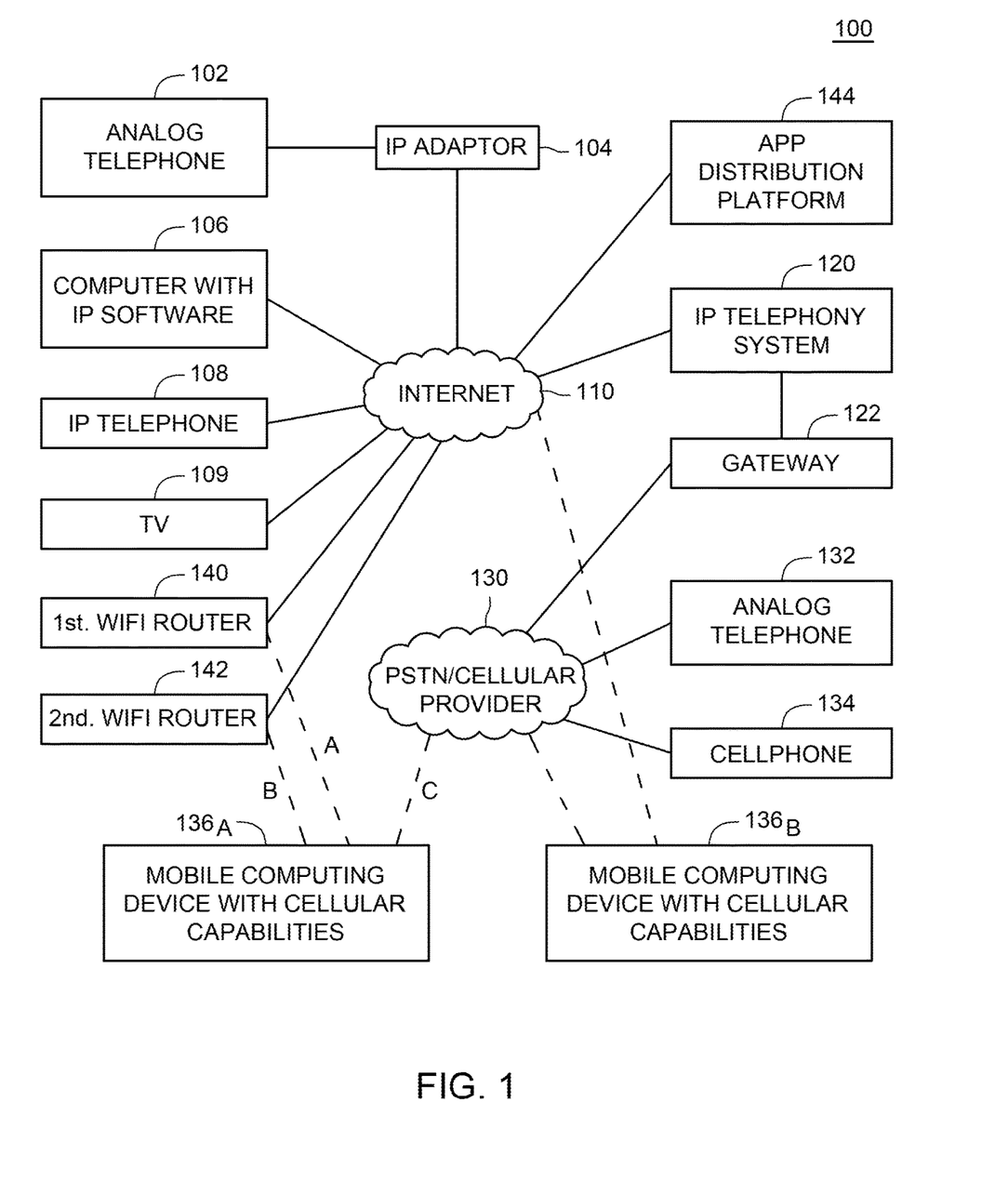
FIG. 1 is a diagram of a communication environment in accordance with one or more exemplary embodiments of the invention.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a packet-switched network of a cellular telephone system to access the Internet 110.

Alternatively, a customer could utilize an analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 120.

In addition, a customer could utilize a soft-phone client running on a computer 106 or a television 109 to place and receive IP based telephone calls, and to access other IP telephony systems (not shown). The computer 106 may be a personal computer (PC), a tablet device, a gaming system, and the like. In some instances, the soft-phone client could be assigned its own telephone number. In other instances, the soft-phone client could be associated with a telephone number that is also assigned to an IP telephone 108, or to a telephone adaptor 104 that is connected one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone that can facilitate voice-based session calls, and an IP telephone that can facilitate data based session calls.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the APPLE IPHONE, that includes both cellular telephone capabilities and a wireless data transceiver that can establish a wireless data connection to a data network. Such a mobile computing device could run appropriate application software to conduct Vol P telephone calls via a wireless data connection. Thus, a mobile computing device, such as an APPLE IPHONE, a RIM BLACKBERRY or a comparable device running GOOGLE ANDROID operating system could be a mobile telephony device.

In still other instances, a mobile telephony device may be a device that is not traditionally used as a telephony device, but which includes a wireless data transceiver that can establish a wireless data connection to a data network. Examples of such devices include the APPLE IPOD TOUCH and the IPAD. Such a device may act as a mobile telephony device once it is configured with appropriate application software.

FIG. 1 illustrates that a mobile computing device with cellular capabilities 136A (e.g., a smartphone) is capable of establishing a first wireless data connection A with a first wireless access point 140, such as a WiFi or WiMax router. The first wireless access point 140 is coupled to the Internet 110. Thus, the mobile computing device 136A can establish a VOIP telephone call with the IP telephony system 120 via a path through the Internet 110 and the first wireless access point 140.

FIG. 1 also illustrates that the mobile computing device 136A can establish a second wireless data connection B with a second wireless access point 142 that is also coupled to the Internet 110. Further, the mobile computing device 136A can establish either a third wireless data connection C via a packet-switch network provided by a cellular service provider 130 using its cellular telephone capabilities, or establish a voice-based session telephone call via a circuit-switched network provided by a cellular service provider 130. The mobile computing device 136A could also establish a VoIP telephone call with the IP telephony system 120 via the second wireless connection B or the third wireless connection C.

Although not illustrated in FIG. 1, the mobile computing device 136A may be capable of establishing a wireless data connection to a data network, such as the Internet 110, via alternate means. For example, the mobile computing device 136A might link to some other type of wireless interface using an alternate communication protocol, such as the WIMAX standard. In the embodiments described above, a device may act as a mobile telephony device once it is configured with appropriate application software that may be downloaded from an app distribution platform 144. For example, mobile computing device 136A may download a VOIP mobile app from app distribution platform 144 and install the VOIP mobile app on mobile computing device 136A.

Similarly, mobile computing device with cellular capabilities 1368 may also be coupled to internet 110 and/or cellular service provider 130. In some embodiments, mobile computing device 1368 may be connected to internet 110 via a WIFI or WIMAX connection, and the like, and can also establish a VOIP telephone calls with the IP telephony system 120 similar to mobile computing device 136A. In embodiments of the present invention, communications environment 100 may be used to establish voice-based or data-based telecommunications sessions between mobile computing device 136A and mobile computing device 1368, depending on various criteria associated with each of the mobile computing devices, as will be described below in more detail.

While the embodiments discussed herein include a centralized identification server that provides recipient information, additional embodiments include a decentralized system, where the end-user devices have the ability to communicate participant information to each other directly.

Figure 2:
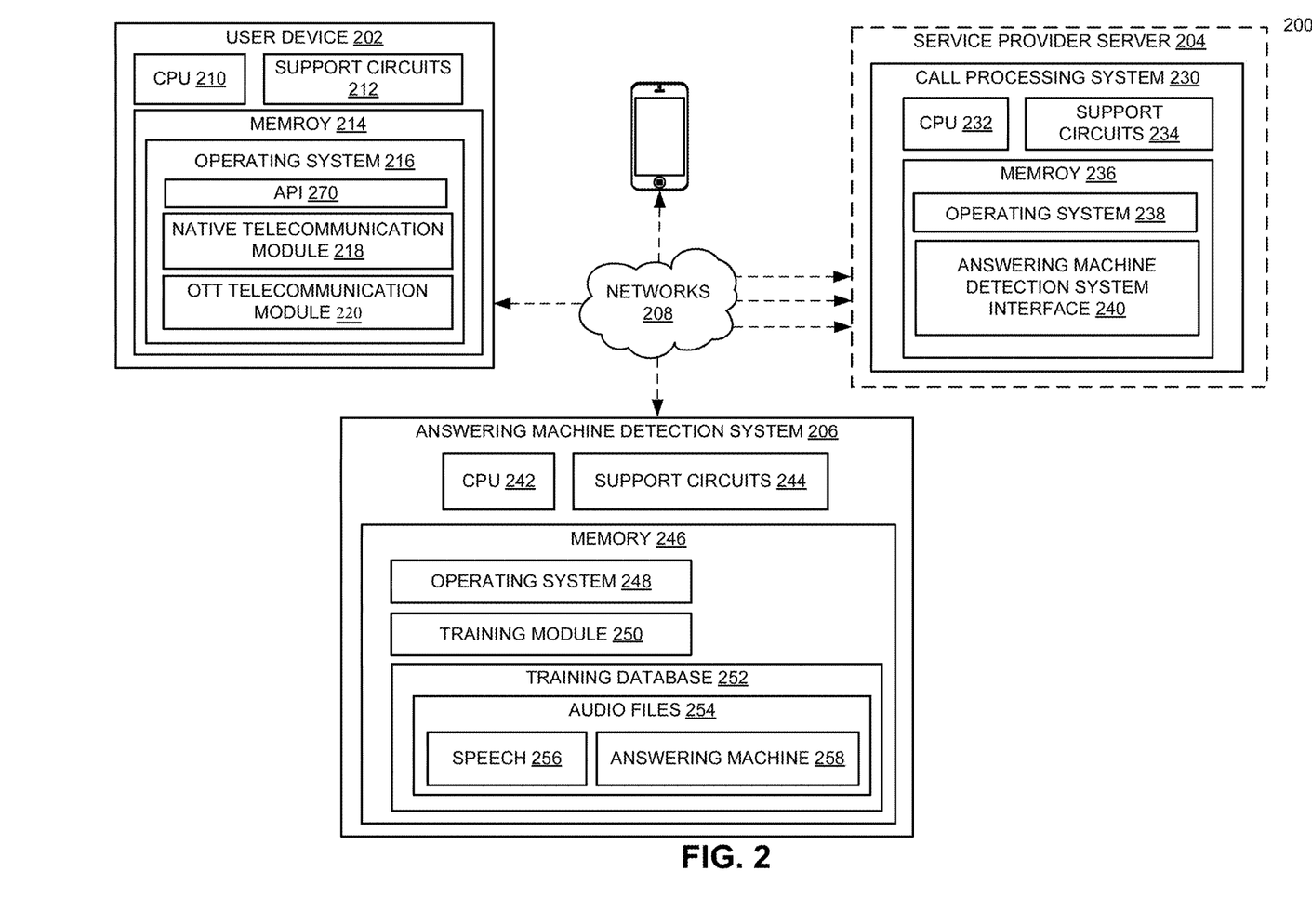
FIG. 2 depicts a block diagram of a system for detecting an answering machine/voicemail system using a machine learning model, according to one or more embodiments of the invention.

FIG. 2 depicts a block diagram of a system 200 for detecting an answering machine/voicemail system using a machine learning model, according to one or more embodiments. The system 200 comprises user device 202, user device 203, a communications service provider server 204, and an answering machine/voicemail system detection system 206, communicatively coupled via networks 208. In some embodiments, the user device 202 and user device 203 may be a mobile computing device (e.g., 136A) associated with a user, and the service provider server 204 may be a server maintained and operated by IP telephony system 120 described above in FIG. 1.

The user device 202 may comprise a Central Processing Unit (CPU) 210, support circuits 212, and a memory 214. The CPU 210 may comprise one or more commercially available microprocessors or microcontrollers that facilitate data processing and storage. The various support circuits 212 facilitate the operation of the CPU 210 and include one or more clock circuits, power supplies, cache, input/output device and circuits, and the like. The memory 214 comprises at least one of Read Only Memory (ROM), Random Access Memory (RAM), disk drive storage, optical storage, removable storage and/or the like. In some embodiments, the memory 214 comprises an operating system 216, telecommunications module 218 including a native dialer, and an over-the-top (OTT) telecommunication module 220, such as a VoIP mobile app or VoIP mobile extension telecommunication app.

The operating system (OS) 216 generally manages various computer resources (e.g., network resources, file processors, and/or the like). The operating system 216 is configured to execute operations on one or more hardware and/or software modules, such as Network Interface Cards (NICs), hard disks, virtualization layers, firewalls and/or the like. Examples of the operating system 216 may include, but are not limited to, various versions of LINUX, MAC OSX, BSD, UNIX, MICROSOFT WINDOWS, 10S, ANDROID and the like. In some embodiments, operating system 216 may include an application programming interface (API) 270 which can be used to access and user device information and features (such as, for example, by OTT telecommunication module 220).

The native telecommunication module 218 may be used to facilitate, and otherwise provide, communication services such as, for example, GSM voice calling, CDMA voice calling, or various other types of communication services provided by a PSTN/Cellular service provider 130 (e.g., using traditional mobile phone mobile communication technology standards).

In some embodiments, the OTT telecommunication module 220 may be a mobile VoIP app that provides VoIP telephony services to an end-user. For example, in some embodiments, OTT telecommunication module 220 may be a mobile extension application installed on each user device 202 and 203 that can associate (e.g., link/charge) outgoing and/or incoming calls made from user devices 202 and 203 to the same VoIP telephony account. In some embodiments, an end-user may download the OTT telecommunication module 220 from communications service provider server 204, or from an app distribution system 144, and install the OTT telecommunication module 220 on their device.

In some embodiments, communications service provider 204 may be a VoIP or cellular service provider that includes a call processing system 230 for processing call requests. In other embodiments, call processing system 230 may be a separate entity that provides call processing services to communications service provider 204, or to individual users, by agreement.

In some embodiments, the call processing system 230 comprises a Central Processing Unit (CPU) 232, support circuits 234, and memory 236. The CPU 232 may comprise one or more commercially available microprocessors or microcontrollers that facilitate data processing and storage. The various support circuits 234 facilitate the operation of the CPU 232 and include one or more clock circuits, power supplies, cache, input/output circuits, and the like. The memory 236 comprises at least one of Read Only Memory (ROM), Random Access Memory (RAM), disk drive storage, optical storage, removable storage and/or the like.

In some embodiments, the memory 236 comprises an operating system 238 and an answering machine/voicemail system detection system interface 240.

The call processing system 230 processes call requests and establishes telecommunication sessions between users, such as for example, between user device 202 and user device 203. In some embodiments, when a telecommunication session has been established, the audio from the call is sent to the answering machine/voicemail system detection system 206 for analysis to determine whether an answering machine/voicemail system has been reached rather than a user of user device 203.

The answering machine/voicemail system detection system 206 may be an external cloud-based system and not part of the communications service provider 204. The answering machine/voicemail system detection system includes a Central Processing Units (CPU) 242, support circuits 244, and memory 246. In some embodiments, the answering machine/voicemail system detection system 206 may be incorporated as part of the communications service provider 204, and specifically, part of call processing system 230.

In other embodiments, the call processing system 230 may establish a connection with the answering machine/voicemail system detection system 206 after initiating the telecommunication session between user device 202 and user device 203.

The answering machine/voicemail system detection system 206 includes in memory 246, an operating system (OS) 248, a training module 250, a training database 252, a machine learning model 260, a model application 262, and an answering machine/voicemail system detection API interface 264. The machine learning model 260 is a deep neural network model. The training database 252 includes sample audio files 254. The audio files 254 includes files containing speech 256, wherein the files containing speech 256 do not include a beep, tone or any positive indication of an answering machine/voicemail system. The audio files 254 also include files containing indicators of an answering machine/voicemail system 258, such as a beep, tone, or similar positive indication of an answering machine/voicemail system.

The OS 248 generally manages various computer resources (e.g., network resources, file processors, and/or the like). The operating system 248 is configured to execute operations on one or more hardware and/or software modules, such as Network Interface Cards (NICs), hard disks, virtualization layers, firewalls and/or the like. Examples of the operating system 248 may include, but are not limited to, LINUX, MAC OSX, BSD, UNIX, MICROSOFT WINDOWS, 10S, ANDROID and the like.

The networks 208 comprise one or more communication systems that connect computers by wire, cable, fiber optic and/or wireless link facilitated by various types of well-known network elements, such as hubs, switches, routers, and the like. The networks 208 may include an Internet Protocol (IP) network 110, a public switched telephone network (PSTN) 130, or other mobile communication networks listed above, and may employ various well-known protocols to communicate information amongst the network resources.

The machine learning model 260 is trained using the audio files 254. The audio files 254 may be .wav files. The audio files 254 are separated into two categories. The answering machine/voicemail system files 258 include only a "beep" sound or similar termination of a call request that goes unanswered by human means from an answering machine/voicemail system. The speech files 256 include other audio from the answering machine/voicemail system, without the "beep" sound. The machine learning model 260 is trained to detect which files include a beep, tone or similar electronically derived signal to a human to begin a voicemail message. The training module 250 converts the audio files 254 into images, such as Mel-spectrograms. The training module 250 inputs the images into the machine learning model 260. For the machine learning model 260 to learn from the audio files 254, the machine learning model 260 makes predictions against a validation set, where the validation set is a matrix containing audio samples from the audio files 254 as well as their actual value (e.g., beep or speech). The machine learning model 260 makes a prediction of whether an answering machine/voicemail system is detected and compares it to the actual value. Using a loss function to optimize the predictions of the machine learning model 260, the goal is to find the best weights (parameters) for the data (i.e., audio files 254), such that the predictions are optimal. Weights are small floating-point numbers that change how the machine learning model 260 learns. If the prediction is incorrect, then the weights are updated inside the network. The machine learning model 260 is trained until the percentage of accurate predictions exceeds a predefined threshold, for example 96%.

After the machine learning model 260 is trained on the separate speech files 256 and answering machine/voicemail system files 258, the machine learning model 260 is loaded into the model application 262.

A user of user device 202 places a call request with the service provider 204. The request is an API call. The service provider 204, upon successful verification of the user, requests a phone number to call. When the phone number is received, the call processing system 230 connects the call to, for example user device 203. After connecting the call, the call processing system 230 opens a connection to the answering machine/voicemail system detection system 206 and, via an API call, streams the audio of the connected call to the answering machine/voicemail system detection system 206. The model application 262 receives an incoming audio stream from a phone call as input. The model application 262 splits the incoming audio stream into a plurality of files, using silence from the audio stream to mark off different sections of the audio. The model application 262 converts each section of the audio stream into an image, such as a Mel-spectrogram, and then inputs the image into the machine learning model 260. If the machine learning model 260 detects an answering machine/voicemail system, the model application 262 sends a message to the call processing system 230 which in turn plays a text-to-speech message into the call indicating an answering machine/voicemail system has been reached. The source code for using the machine learning model 260 may be, for example as follows:

info("record clip")
    fn="rec-{ }-
    { }.wav".format(uuid,datetime,datetime,now( ).strftime ("%Y%m%dT%H%M%S,%f"))
    output=wave.open(fn, 'wb')
    output.setparams(
    (1, 2, RATE, 0, 'NONE', 'not compressed'))
    output.writeframes(payload)
    output.close( )
    prediction=model.predict_from_file(fn)
    if prediction=='beep':
    nexmo_client.send_speech(uuid, text='Answering Machine Detected')

Figure 3:
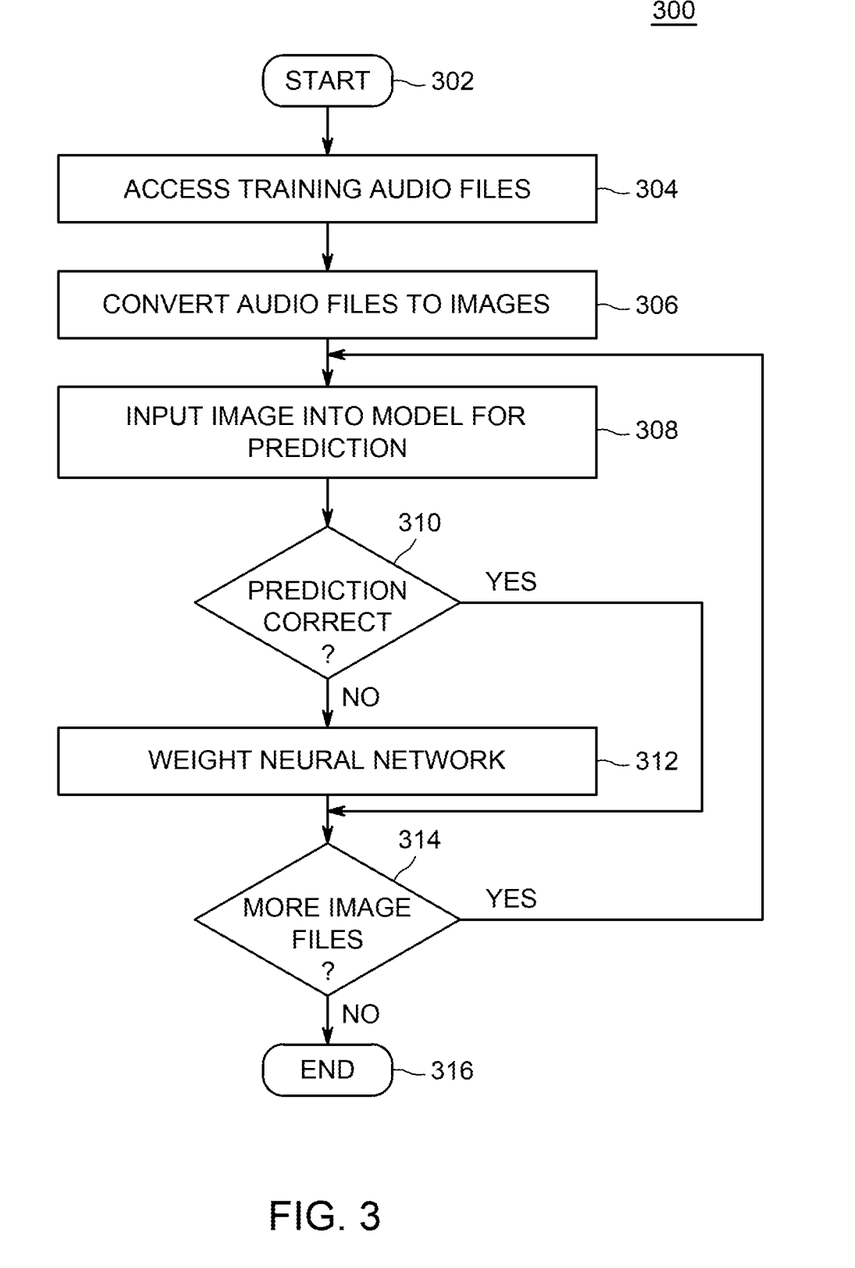
FIG. 3 depicts a flow diagram of a method for training a machine learning model to detect an answering machine/voicemail system, according to one or more embodiments of the present invention.

FIG. 3 depicts a flow diagram of a method 300 for training a machine learning model to detect an answering machine/voicemail system, in accordance with one or more embodiments of the present invention. The method 300 may be performed using one or more of the modules described above with respect to FIG. 2. The method 300 may repeated as may times as needed to produce a successful prediction rate above a desired threshold. The method 300 starts at step 302 and proceeds to step 304.

At step 304, a plurality of training audio files are accessed. The audio files are of two types, specifically, audio files than contain an answering machine/voicemail system beep, tone or other electronic or mechanically originated sound and audio files of answering machine/voicemail system messages that do not include such sounds. In some embodiments, the audio files are WAV files.

At step 306, each audio file is converted to an image that is a visual representation of the audio file. In some embodiments, each audio file is converted to a Mel-spectrogram.

At step 308, an image of a converted audio file is input into the machine learning model. The machine learning model predicts whether a beep is detected is the input image of the audio file.

At step 310, it is determined whether the prediction output from machine learning model is correct. If the prediction is not correct, then at step 312, a weight is updated inside the neural network for the model and the method 300 proceeds to step 314. However, if at step 310, it is determined that the prediction by the machine learning model is correct, then the method 300 proceeds directly to step 314.

At step 314, it is determined whether there are additional image files of the converted audio to be input into the machine learning model. If there are additional image files, the method 300 loops back to step 308 and iterates until at step 314 it is determined that all image files have been input into the machine learning model, at which point the method 300 ends at step 316.

Figure 4:
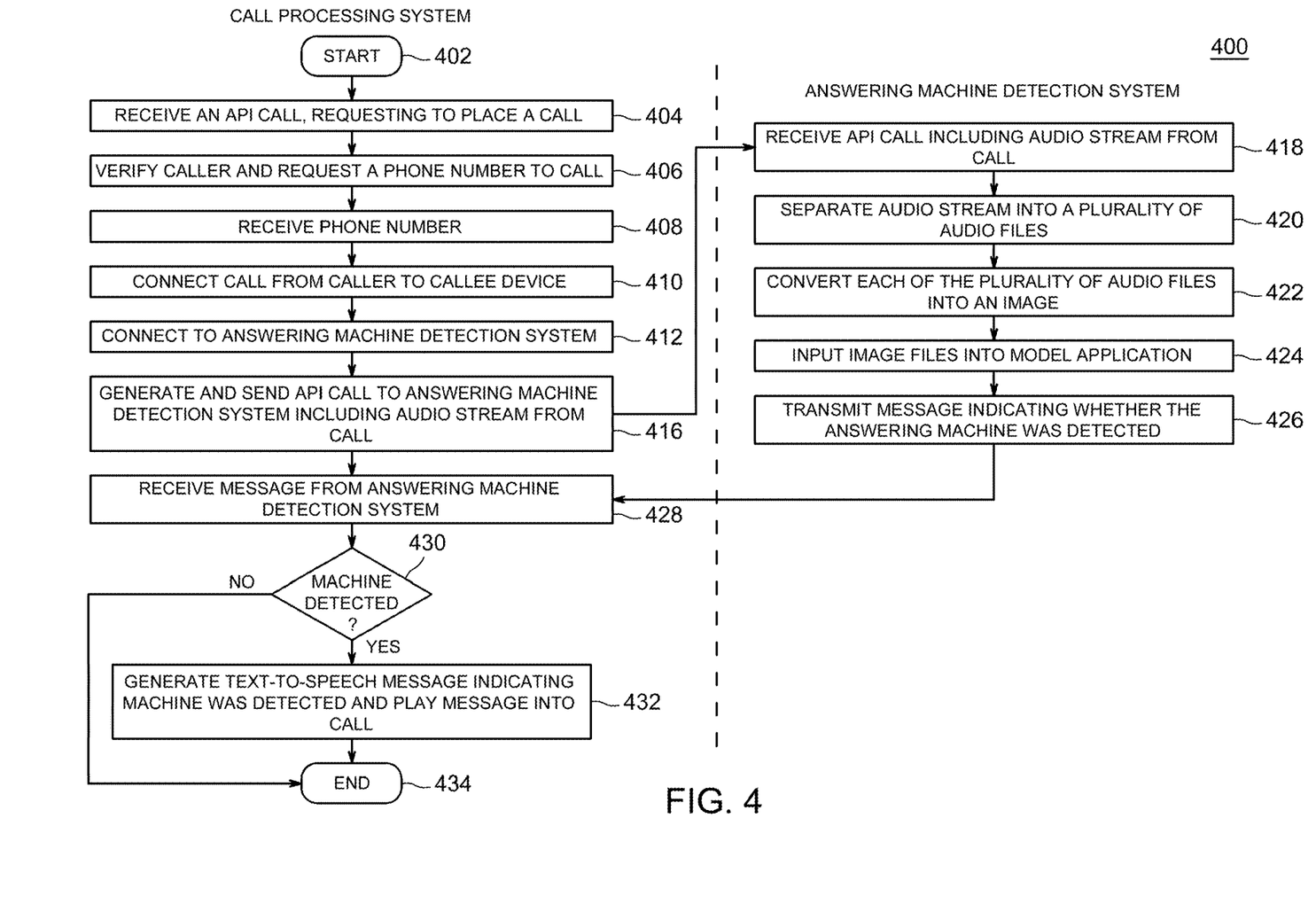
FIG. 4 depicts a flow diagram of a method for detecting an answering machine/voicemail system using a machine learning model, in accordance with one or more embodiments of the present invention.

FIG. 4 depicts a flow diagram of a method 400 for using a machine learning model to detect an answering machine/voicemail system, in accordance with one or more embodiments of the present invention. The method 400 may be performed using one or more of the modules described above with respect to FIG. 2. The method 400 starts at step 402 and proceeds to step 404.

At step 404, an API call from a user device is received requesting a call to be placed.

At step 406, the user of the user device is verified and a message is transmitted to the user device requesting a phone number that the user would like to connect to.

At step 408, the phone number is received and at step 410, the call is connected.

At step 410, a connection is also established to an answering machine/voicemail system detection system. The connection to the answering machine/voicemail system detection system may be performed using a WebSocket protocol.

At step 416, an API call including the audio stream from the call, is generated and sent to the answering machine/voicemail system detection system.

At step 418, an API call is received including the audio from phone call. The phone call was placed to the received phone number and the call was answered. At this point it is unknown whether the call was answered by a human or if the call was sent to an answering machine/voicemail system.

At step 420, the audio from the phone call is separated into a plurality of audio files. Using silence in the audio stream as a dividing point, the audio is separated in files, such as WAV files.

At step 422, each of the separate audio files from the audio of the phone call are converted into image files, such as Mel-spectrograms.

At step 424, each image file is input into the machine learning model. The machine learning model determines, based on the image files, whether an answering machine/voicemail system is detected.

At step 26, a message indicating whether an answering machine/voicemail system was detected is transmitted to the call processing system.

At step 428, the message is received indicating whether an answering machine/voicemail system has been reached. At step 430, if an answering machine/voicemail system was not reached, then method 400 proceeds directly to step 434 and ends. However, if an answering machine/voicemail system was detected, then at step 432, a text-to-speech message is played into the call indicated that an answering machine/voicemail system has been reached.

The method 400 ends at step 434.

Figure 5:
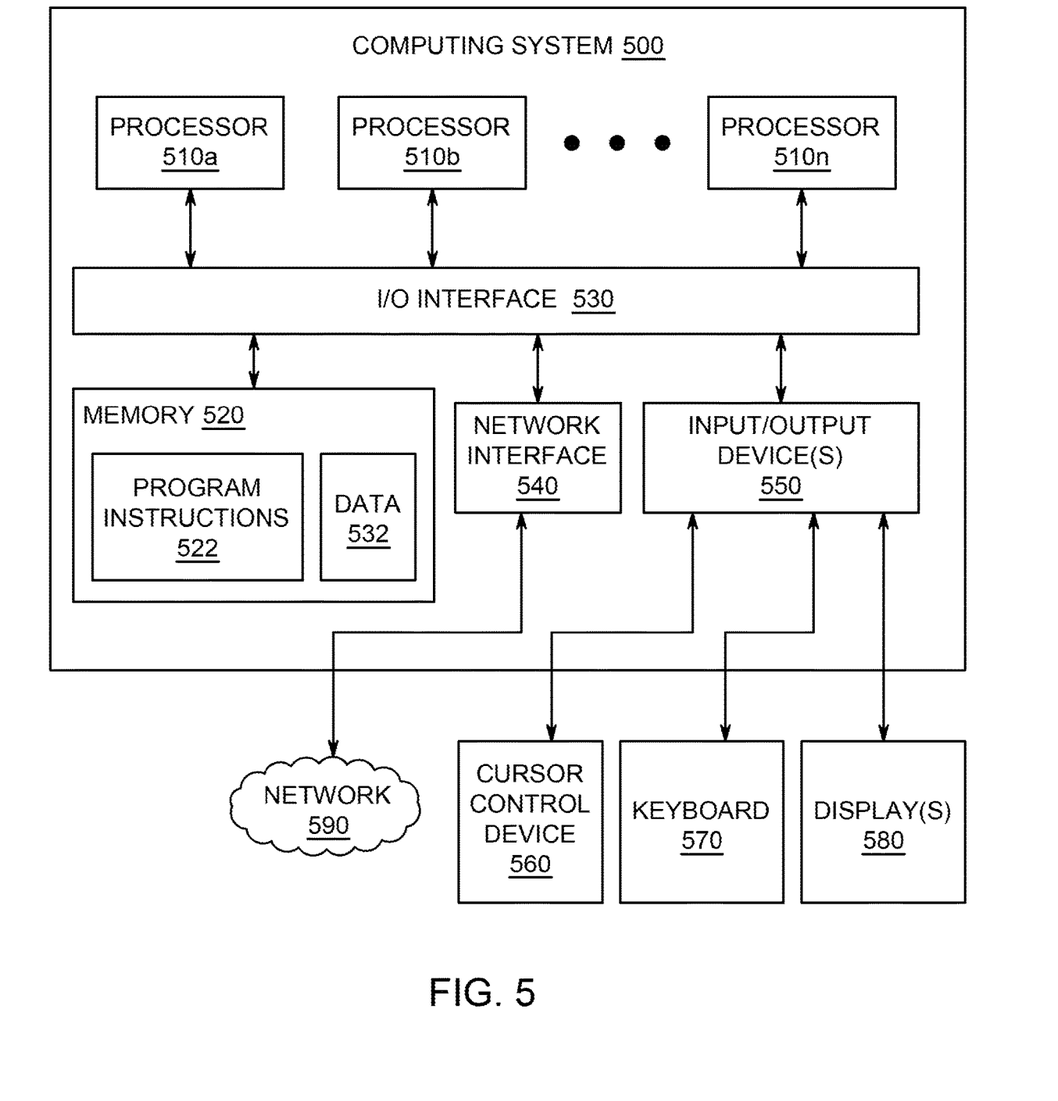
FIG. 5 is an exemplary diagram of a computer system for detecting an answering machine/voicemail system using a machine learning model, in accordance with one or more embodiments of the present invention.

FIG. 5 is an exemplary diagram of a computer system 500 for detecting an answering machine/voicemail system using a machine learning model in accordance to one or more embodiments of the present invention. The computer system 500 includes substantially similar structure comprising servers or electronic devices in the aforementioned embodiments.

Various embodiments of methods and system detecting an answering machine/voicemail system using a machine learning model, as described herein, may be executed on one or more computer systems, which may interact with various other devices. One such computer system is computer system 500 illustrated by FIG. 5, which may in various embodiments implement any of the elements or functionality illustrated in FIGS. 1-4. In various embodiments, computer system 500 may be configured to implement methods described above. The computer system 500 may be used to implement any other system, device, element, functionality or method of the above-described embodiments. In the illustrated embodiments, computer system 500 may be configured to implement methods 300 and 400 as processor-executable executable program instructions 522 (e.g., program instructions executable by processor(s) 510) in various embodiments.

In the illustrated embodiment, computer system 500 includes one or more processors 510a-510n coupled to a system memory 520 via an input/output (I/O) interface 530. Computer system 500 further includes a network interface 540 coupled to I/O interface 530, and one or more input/output devices 560, such as cursor control device 560, keyboard 570, and display(s) 580. In some embodiments, the keyboard 570 may be a touchscreen input device.

In various embodiments, any of the components may be utilized by the system to authenticate a user as described above. In various embodiments, a user interface may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, personal computer systems, mainframe computer systems, handheld computers, workstations, network computers, application servers, storage devices, a peripheral devices such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, cellular networks, Wi-Fi, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display devices, keyboards, keypads, cameras, touchpads, touchscreens, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the methods described above, such as the methods illustrated by the flowcharts of FIG. 3 and FIG. 4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, smartphones, tablets, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer-implemented method for training a machine learning model to detect electronically based responses to an unanswered communication session request comprising:
   accessing a plurality of training audio files;
   converting each of the plurality of audio files into an image that is a visual representation of the audio file;
   inputting each of the converted images into the machine learning model; and
   for each converted image:
      receiving a prediction of whether the input converted image is a positive indication of an electronically based response to the unanswered communication session request; and
      adjusting a weight in the model when the prediction is incorrect.

2. The computer-implemented method of claim 1, wherein each of the plurality of audio files comprises sounds selected from the group consisting of an electronically or mechanically derived tone and speech that does not include the electronically or mechanically derived tone.

3. The computer-implemented method of claim 1, wherein the plurality of audio files are WAV files.

4. The computer-implemented method of claim 1, wherein the image is a Mel-spectrogram.

5. The computer-implemented method of claim 1, wherein the machine learning model is a deep neural network model.

6. A computer-implemented method for detecting electronically based responses to an unanswered communication session request comprising:
   receiving an audio stream from a requested telecommunication session;
   parsing the audio stream into a plurality of audio files;
   converting each of the plurality of audio files into an image;
   inputting each of the converted images into a machine learning model;
   receiving a prediction from the machine learning model; and
   sending an indication that an electronically based response to the requested telecommunication session is detected based on the received prediction.

7. The computer-implemented method of claim 6, wherein the audio stream is received in an API call.

8. The computer-implemented method of claim 6, wherein the plurality of audio files are WAV files.

9. The computer-implemented method of claim 6, wherein the image is a Mel-spectrogram.

10. The computer-implemented method of claim 6, wherein sending the indication causes a text-to-speech message indicating that an answering machine has been reached to be input into the telecommunication session.

11. A system for detecting an answering machine using a machine learning model comprising:
   a call processing system configured to:
      connect a telecommunication session between a first user device associated with a caller and a second user device associated with a callee; and
      transmit an audio stream from the telecommunication session to an answering machine detection system; and
   the answering machine detection system configured to:
      receive an audio stream of the telecommunication session;
      parse the audio stream into a plurality of audio files;
      convert each of the plurality of audio files into an image;
      input each of the converted images into the machine learning model;
      receive a prediction from the machine learning model; and
      send an indication that an answering machine is detected when the received prediction is a beep.

12. The system of claim 11, wherein the call processing system is further configured to:
receive, from a user device, an Application Programming Interface (API) request to initiate the telecommunication session;
receive a phone number to connect the user device to; and
establish the telecommunication session to the phone number in the request;
establish a connection to the answering machine detection system; and
send an API call including an audio stream from the phone call to the answering machine detection system.

13. The system of claim 11, wherein the plurality of audio files are WAV files.

14. The system of claim 11, wherein the image is a Mel-spectrogram.

15. The system of claim 11, wherein the call processing system is further configured to input a text-to-speech message into the telecommunication session indicating that an answering machine has been reached.

16. A non-transitory computer readable medium for storing computer instructions that, when executed by at least one processor causes the at least one processor to perform a method for detecting an answering machine using a machine learning model comprising:
receiving an audio stream from a telecommunication session;
parsing the audio stream into a plurality of audio files;
converting each of the plurality of audio files into an image;
inputting each of the converted images into the machine learning model;
receiving a prediction from the machine learning model; and
sending an indication that an answering machine is detected when the received prediction is a beep.

17. The non-transitory computer readable medium of claim 16, wherein the audio stream is received in an API call.

18. The non-transitory computer readable medium of claim 16, wherein the plurality of audio files are WAV files.

19. The non-transitory computer readable medium of claim 16, wherein the image is a Mel-spectrogram.

20. A computer-implemented method for processing a call when an answering machine is detected using a machine learning, comprising:
receiving, from a user device, an Application Programming Interface (API) request to initiate a telecommunication session;
receiving a phone number to connect the user device to; and
establishing the telecommunication session to the phone number in the request;
establishing a connection to an answering machine detection system;
sending an API call including an audio stream from the telecommunication session to the answering machine detection system receiving a message from the answering machine detection system, indicating whether an answering machine is detected; and
in response to receiving a positive indication of an answering machine, inputting a text-to-speech message into the telecommunication session indicating that an answering machine has been reached.

* * * * *

UNITED STATES PATENT AND TRADEMARK OFFICE
CERTIFICATE OF CORRECTION

| | | |
|---|---|---|
| PATENT NO. | : 11,295,734 B2 | |
| APPLICATION NO. | : 16/830640 | |
| DATED | : April 5, 2022 | |
| INVENTOR(S) | : Antonio Hung | |

It is certified that error appears in the above-identified patent and that said Letters Patent is hereby corrected as shown below:

In the Specification

In Column 6, Line 2, replace "1368" with -- $136_B$ --

In Column 6, Line 4, replace "1368" with -- $136_B$ --

In Column 6, Line 11, replace "1368" with -- $136_B$ --

In Column 10, Line 42, replace "step 26" with -- step 426 --

In the Claims

In Claim 20, Column 16, Line 24, replace
"sending an API call including an audio stream from the telecommunication session to the answering machine detection system receiving a message from the answering machine detection system, indicating whether an answering machine is detected; and" with
-- sending an API call including an audio stream from the telecommunication
       session to the answering machine detection system;
receiving a message from the answering machine detection system, indicating
       whether an answering machine is detected; and --

Signed and Sealed this
Second Day of May, 2023

Katherine Kelly Vidal
*Director of the United States Patent and Trademark Office*